United States Patent [19]

Hochberg et al.

[11] Patent Number: 4,900,610

[45] Date of Patent: Feb. 13, 1990

[54] POLYESTER MOLDING COMPOSITION

[75] Inventors: Arie A. Hochberg, Montclair; Varkki P. Chacko, Summit; Paul DeStio, Bound Brook, all of N.J.

[73] Assignee: Hoechst Celanese Corporation, Somerville, N.J.

[21] Appl. No.: 157,951

[22] Filed: Feb. 19, 1988

[51] Int. Cl.[4] ............................................. C08L 67/02
[52] U.S. Cl. .................................... 428/195; 524/449; 524/513; 524/539; 525/64; 525/176; 525/444
[58] Field of Search ........................ 525/444, 176, 64; 428/195; 524/449, 513, 539

[56] References Cited

U.S. PATENT DOCUMENTS

| 3,578,729 | 5/1971 | Brinkmann | 525/176 |
| 4,096,202 | 6/1978 | Farnham | 523/201 |
| 4,125,571 | 11/1978 | Scott | 525/444 |
| 4,349,503 | 9/1982 | Aharoni | 264/328.16 |
| 4,465,728 | 8/1984 | Haigh et al. | 428/156 |
| 4,587,155 | 5/1986 | Durand | 428/195 |

OTHER PUBLICATIONS

"Hot Stamping Shows a World of Versatility", Modern Plastics, Dec. 1985.

*Primary Examiner*—Patricia Short
*Attorney, Agent, or Firm*—Depaoli & O'Brien

[57] ABSTRACT

A thermoplastic molding composition comprising a polyester blend of polybutylene terephthalate and a copolyester derived from condensing ethylene glycol, cyclohexanedimethanol and terephthalic acid wherein the ethylene glycol units of the copolyester comprises at least 25 mole % based on the total glycol content. The polyester blend can also include an impact modifier. The blend is useful in the formation of molded keycaps.

19 Claims, No Drawings

POLYESTER MOLDING COMPOSITION

This invention is concerned with thermoplastic polyester compositions. More particularly, it relates to a molding composition comprising a blend of a poly(1,4-butylene terephthalate) and a copolyester resin of poly(ethylene cyclohexanedimethylene terephthalate).

BACKGROUND OF THE INVENTION

Poly(1,4-butylene terephthalate) resins are well know and have been widely employed for the production of thermoplastic molded articles. Also, reinforced compositions of poly(1,4-butylene terephthalate) have been commercially available for a number of years. Unfilled poly(1,4-butylene terephthalate) has good processability, strength and toughness. Other key properties include low water absorption resulting in good dimensional stability, low static and dynamic coefficients of friction, good chemical and abrasion resistance, and good electrical properties. However, the unfilled poly(1,4-butylene terephthalate) has a relatively low heat deflection temperature which limits its use. Also, unfilled poly(1,4-butylene terephthalate) has a tendency to shrink to a great extent after being molded.

Reinforced poly(1,4-butylene terephthalate) and, particularly, glass reinforced poly(1,4-butylene terephthalate) has additionally increased tensile strength over the unfilled poly(1,4-butylene terephthalate). However, when molded, reinforced, particularly glass reinforced poly(1,4-butylene terephthalate) has a tendency to become distorted or warped.

U.S. Pat. No. 4,125,571 discloses a thermoplastic composition comprising a combination of poly (1,4-butylene terephthalate) and a polyester resin derived from cyclohexanedimethanol and a hexacarbocyclic dicarboxylic acid such as terephthalic acid. It was found that the shrinkage of poly (1,4-butylene terephthalate) resin was reduced while increasing the heat deflection temperature. Reinforced polybutylene terephthalate molding compositions had increased resistance to warpage or distortion upon removal from the mold upon adding the polyester resin derived from cyclohexanedimethanol. The patent broadly states that cyclohexanedimethanol and minor amounts of other bifunctional alcohols can be condensed with the dicarboxylic acid. Examples of such bifunctional glycols include ethylene glycol, butylene glycol, etc. However, the patent does not describe any minimum or maximum for the minor amounts of other bifunctional glycols to be included in the polyester resin. The examples in this U.S. patent are directed to a poly(1,4-cyclohexanedimethanol terephthalate-co-isodialate) resin which is sold under the trade name of KODAR A150, from Eastman Chemical Products.

U.S. Pat. No. 4,225,688 discloses a copolyester composition which exhibits good bonding characteristics to polyvinylchloride plastics, consisting essentially of: from 80-95% by weight of a rigid poly(ethylene cyclohexanedimethylene terephthalate) such as exemplified by the commercial product KODAR PETG 6763; and 5-20% by weight of a flexible copolymer containing alternating blocks of poly(butylene terephthalate) and poly (1,4 butylene oxide) as exemplified by Hytrel a commercial product from the E.I. Dupont de Nemours and Company.

U.S. Pat. No. 4,287,325 discloses a polyester blend comprising a copolyester formed from terephthalic acid, isophthalic acid and bisphenol A and a polyester derived from terephthalic acid, ethylene glycol and 1,4-cyclohexanedimethanol.

U.S. Pat. No. 4,582,876 discloses a molding composition having high impact which comprises a blend of a copolyester formed from terephthalic acid, 1,4-cyclohexanedimethanol and ethylene glycol and a rubber-modified styrene-maleic anhydride copolymer.

SUMMARY OF THE INVENTION

It has been found that the addition of a copolyester resin derived from ethylene glycol, cyclohexanedimethanol and terephthalic acid to poly(1,4-butylene terephthalate) (PBT) resin reduces the shrinkage of the PBT while increasing the deflection temperature under load. Additionally, if the copolyester resin derived from ethylene glycol, cyclohexanedimethanol and terephthalic acid is added to a reinforced poly(1,4-butylene terephthalate) molding composition, the molded articles are substantially resistant to warpage or distortion after they are removed from the mold. This result is achieved without any appreciable decrease in mechanical, physical or molding properties of a typical glass reinforced poly(1,4-butylene terephthalate) molding composition.

Moreover, it has been found that the addition of multiphase ABS and MBS impact modifiers to the polyester blend improve impact strength without adversely affecting the improved warpage properties. Poly(ethylene ethylacrylate) impact modifier has also been found to improve the impact strength of the polyester blend at low levels of addition.

DETAILED DESCRIPTION OF THE INVENTION

According to this invention, there is provided a thermoplastic composition comprising a blend of poly(1,4-butylene terephthalate) resin and a copolyester resin derived from ethylene glycol, cyclohexanedimethanol, and terephthalic acid.

A preferred feature of this invention is to provide reinforced thermoplastic compositions comprising poly(1,4-butylene terephthalate) resin, a copolyester resin derived from ethylene glycol, cyclohexanedimethanol, and terephthalic acid, and a reinforcing amount of a reinforcing filler.

The high molecular weight, polymeric 1,4-butylene glycol terephthalate has repeating units of the general formula:

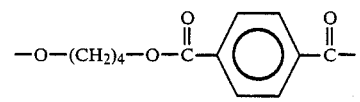

Also contemplated are mixtures of the ester with minor amounts, e.g., from 0.5 to 2% by weight, of units derived from aliphatic or aromatic dicarboxylic acids and/or aliphatic polyols, e.g., glycols, i.e., copolyesters. These can be made by following the teachings outlined in Whinfield et al, U.S. Pat. No. 2,465,316 and Pengilly, U.S. Pat. No. 3,047,539, for example. Among the units which can be present in the copolyesters are those derived from aliphatic dicarboxylic acids, e.g., of up to about 50 carbon atoms, including straight and branched chain acids, such as adipic acid, dimerized $C_{16}$–$C_{18}$ unsaturated acids (which have 32 to 36 carbon atoms), trimerized such acids, and the like. Among the units in the copolyesters can also be minor amounts derived from aromatic dicarboxylic acids, e.g., of up to about 36 carbon atoms, such as isophthalic acids and the like. In addition to the 1,4-butylene glycol units, there can also be minor amounts of units derived from other aliphatic glycols and polyols, e.g., of up to about 50 carbon atoms, including ethylene glycol, propylene glycol, glycerol and the like. Such copolyesters can be made by techniques well known to those skilled in the art. Poly(1,4-butylene terephthalate) homopolymer is the preferred polyester and is commercially available.

These polymeric 1,4-butylene glycol terephthalates have an intrinsic viscosity of at least 0.4 and preferably at least about 0.7 deciliters/gram as measured in o-chlorophenol, a 60/40 phenol tetrachloroethane mixture or a similar solvent at 25°–30° C. The upper limit is not critical, but it will generally be about 5.0 dl./g. Especially preferred PBT polyesters will have an intrinsic viscosity in the range of about 0.7 to 2.0.

The copolyesters for use in the blend with PBT are prepared by condensing ethylene glycol, and either the cis- or trans-isomer (or a mixture thereof) of 1,4-cyclohexanedimethanol with terephthalic acid. The amount of the ethylene glycol component present in the copolyester can vary widely, but it is preferred that the ethylene glycol component be present in amounts of at least about 25 mole percent relative to the total glycol residues. More preferably, the glycol component of the copolyester will comprise 30–70 mole percent ethylene glycol and 70–30 mole percent cyclohexanedimethanol. It is preferred that the copolyester include terephthalic acid as the sole acid residue of the copolyester.

The copolyesters of this invention are available as commercial products. Thus, copolyester materials known as poly(ethylene cyclohexanedimethylene terephthalate) are sold by the Eastman Kodak Company, for example, under the trademarks Kodar PCTG 5445 and Kodar PETG 6763. Kodar PCTG 5445 is believed to be a polyester based on cyclohexanedimethylene terephthalate modified with approximately 30 mole percent ethylene glycol relative to the total glycol component of the copolyester. Kodar PETG 6763 is a copolyester of polyethylene terephthalate, modified with cyclohexanedimethanol also sold by the Eastman Kodak Company and having approximately 70 mole percent of ethylene glycol units relative to the total glycol component.

These copolyesters should have an intrinsic viscosity between 0.40 and 2.0 dl/g measured in a 60/40 phenol-tetrachloroethane solution or a similar solvent at 25°–30° C. Especially preferred polyesters will have an intrinsic viscosity in the range of 0.6 and 1.2 dl/g.

The poly(1,4-butylene terephthalate) resin and the copolyester resin derived from ethylene glycol and cyclohexanedimethanol are combinable with each other in all proportions, such as 1 to 99 parts by weight of poly(1,4-butylene terephthalate and 99 to 1 parts by weight of the polyester. In general, however, blend compositions containing from about 50 to about 90 parts by weight of poly(1,4-butylene terephthalate) and from about 10 to 50 parts by weight of the copolyester are preferred. Especially preferred are blends comprising 70 to 85% by weight polybutylene terephthalate and 15 to 30% by weight of the copolyester.

Reinforcing agents my be included in the polyester blend and can be selected from finely divided aluminum, iron or nickel and the like, metal oxides, and non-metals, such as carbon filaments, silicates, such as mica, aluminum silicate (clay), talc, asbestos, titanium dioxide, Wollastonite, Novaculite, potassium titanate and titanate whiskers, glass flakes, glass beads and fibers and polymeric fibers and combinations thereof.

Although it is only necessary to use a reinforcing amount of the reinforcing agent, from 1–60 parts by weight of the total weight of the composition may comprise the reinforcing agent. A preferred range is from 5–50 parts by weight.

The preferred reinforcing agents are of glass, and it is preferred to use fibrous glass filaments, mixtures of glass and talc, glass and mica, glass and aluminum silicate, and glass fibers and glass beads, for example, to improve both shrinkage and warpage of the molded products.

An impact modifier which can be used effectively in the polyester blend of this invention is a multiphase composite interpolymer comprising 25 to 95 weight percent of a first elastomeric phase and 75 to 5 weight percent of a final rigid thermoplastic phase. One or more intermediate phases are optional, e.g., a middle stage polymerized from 75 to 100 percent by weight of styrene may be incorporated.

The first stage is polymerized utilizing 75 to 99.8 weight percent $C_1$ to $C_6$ alkyl acrylate, generally resulting in an acrylic rubber core having a $T_g$ below 10° C., and cross-linked with 0.1 to 5 weight percent cross-linking monomer and further containing 0.1 to 5 weight percent graftlinking monomer. The preferred alkyl acrylate is butyl acrylate.

The cross-linking monomer is a polyethylenically unsaturated monomer having a plurality of additional polymerizable reactive groups, all of which polymerize at substantially the same rate of reaction. Suitable cross-linking monomers include polyacrylic and methacrylic esters of polyols such as butylene diacrylate and butylene dimethacrylate, trimethylolpropane trimethacrylate and the like; di- and trivinyl benzene, vinyl and the like. The preferred cross-linking monomer is butylene diacrylate.

The graftlinking monomer is a polyethylenically unsaturated monomer having a plurality of additional polymerizable reactive groups, at least one of the reactive groups polymerizing at a substantially different rate of polymerization from at least one other of said reactive groups. The function of the graftlinking monomer is to provide a residual level of unsaturation in the elastomeric phase, particularly in the latter stages of polymerization and, consequently, at or near the surface of the elastomeric particles. When the rigid thermoplastic phase is subsequently polymerized at the surface of the elastomer, the residual unsaturated additional polymerizable reactive groups contribute by the graftlinking monomer participate in the subsequent reaction so that at least a portion of the rigid phase is chemically attached to the surface of the elastomer. Among the effective graftlinking monomers are allyl groups containing monomers such as allyl esters of ethylenically unsaturated acids, e.g. allyl acrylate, allyl methacrylate, diallyl maleate, diallyl fumarate, diallyl itaconate, allyl acid maleate, allyl acid fumarate and allyl acid itaconate. Somewhat less preferred are the diallyl esters of polycarboxylic acids which do not contain polymerizable unsaturation. The preferred graftlinking monomers are allyl methacrylate and diallyl maleate.

The final stage can be polymerized from a monomer system comprising $C_1$ to $C_{16}$ alkyl methacrylate, styrene, acrylonitrile, alkyl acrylates, allyl methacrylate, diallyl methacrylate and the like, as long as the overall $T_g$ is at least 20° C. Preferably the final stage monomer system is at least 50 weight percent of a $C_1$ to $C_4$ alkyl acrylate.

A most preferred interpolymer has only two stages. The first stage, about 60 to 95 weight percent of the interpolymer, is polymerized from a monomer system comprising 95 to 99.8 weight percent butyl acrylate, 0.1 to 2.5 weight percent butylene diacrylate as the crosslinking agent and 0.1 to 2.5 weight percent allyl methacrylate or diallyl maleate as the graftlinking monomer. The final stage of the interpolymer is polymerized from 5 to 40 weight percent methyl methacrylate.

The most preferred multiphase composite interpolymer is commercially available from Rohm and Haas and is designated as Acryloid KM-330 ™.

Another useful impact modifier for use in the polyester blend of this invention is poly(ethylene ethylacrylate) (PEEA). The impact modifier is a copolymer comprising 70 to 90 mole percent ethylene units and 10 to 30 mole percent recurring ethylacrylate units. A preferred impact modifier will have 80 to 90 mole percent ethylene and 10 to 20 mole percent ethylacrylate.

The impact modifier, if used in the polyester blend, will generally comprise from about 2 to about 30 weight percent based on the total weight of the composition. It has been found, however, that when using PEEA, amounts of 2–10 wt.% are useful, preferably about 5 wt.%, while the multiphase "Acryloid" modifiers usually require more than 10 wt.% to improve impact of the blend.

The polyester blend composition may be prepared by conventional techniques. One convenient method comprises blending the polyesters in powder or granular form, extruding the blend and comminuting into pellets or other suitable shapes.

The reinforcements are added in any usual manner, i.e, by dry blending or mixing or by mixing in the melted state in an extruder, or a heated mill or in other mixers.

Obviously, other materials can also be employed with the composition of this invention and include such materials as anti-static agents, pigments, mold release agents, thermal stabilizers, flame retardants, impact modifiers, extenders, UV stabilizers and the like.

The polyester blends of the present invention have particular use as molding compositions in the formation of keycaps such as used in word processing and computing equipment. It has been found that the polyester blend of the present invention has comparable impact strength and shrinkage to ABS resins which are typically used for molding keycaps. Additionally, the polyester blend of this invention has improved solvent resistance and fatigue characteristics relative to existing ABS materials and as well is able to be printed by sublimation printing which allows the keycaps to be molded in one step as opposed to the previous step of molding the keycaps and subsequently molding the printed letters and numerals onto the surface of the keycaps. Importantly, the polyester blend of this invention can also be molded in the same equipment as the ABS molding resin and, thus, the use of the polyester blend does not require retooling.

EXAMPLE 1

In this example, variable amounts of polybutylene terephthalate and a copolyester of poly(ethylene cyclohexanedimethylene terephthalate) are compounded with and without an impact modifier in order to assess the impact strength of the polyester blend.

The following ingredients are dried:
polybutylene terephthalate, intrinsic viscosity, 1.2 dl/g, GAFITE 1600A, GAF Co.;
poly(ethylene, 1,4-cyclohexanedimethylene terephthalate), KODAR PCTG 5445, Eastman Chemical Products;
polycarbonate, Calibre 300-3, Dow Chemical;
MBS impact modifier, Paraloid 8407 XP, Rohm and Haas Co.

The blends are compounded in an extruder at about 540° F. The extrudate is pelletized and the pellets are injection molded at 500° F, mold temperature 100° F, into ASTM type test bars in a standard machine. The test bars are tested for impact strength, ASTM D-256. The formulations and room temperature notched Izod strength are set forth in Table 1.

TABLE 1

| Ingredients wt. % | Unfilled Polyester Blend | | | | | | | | | |
|---|---|---|---|---|---|---|---|---|---|---|
| | A | B | C | D | E | F | G | H | I | J |
| 1. PBT | 85 | 80 | 50 | 80 | 75 | 70 | 75 | 70 | 65 | 50 |
| 2. PCTG 5445 | | | 50 | 5 | 10 | 15 | 5 | 10 | 15 | |
| 3. MBS impact modifier | 15 | 20 | | 15 | 15 | 15 | 20 | 20 | 20 | |
| 4. Polycarbonate | | | | | | | | | | 50 |
| RT Notched IZOD (ft-lb/in) | 16.8 | 18.7 | 0.78 | 18.5 | 19.2 | 20.3 | 20.7 | 20.1 | 21.11 | 1.11 |

It can be seen that the polyester blends of the present invention have greatly enhanced impact strength upon the addition of the MBS impact modifier to the blend. Sample C which includes a polyester blend without the additional impact modifier has an impact strength similar to the unfilled polybutylene terephthalate which has a room temperature notched Izod of about 1.0 ft-lb/in. Sample C also has only a slightly reduced notched Izod strength relative to a blend of PBT and polycarbonate (Sample J).

EXAMPLE 2

The following ingredients are dried:
polybutylene terephthalate, intrinsic viscosity 1.0 dl/g, Celanex, Hoechst Celanese Co.;
poly(ethylene 1,4-cyclohexanedimethylene terephthalate), KODAR PETG-6763, Eastman Chemical Products;
polycarbonate, Merlon M-40, Mobay Chemical Corp.;
ABS impact modifier, Acryloid KM-330, Rohm and Haas Co.;
fibrous glass reinforcement.

The compositions of the above ingredients are extruded and molded into standard test bars by the procedure of Example 1 except that the mold temperature used is about 160° F. The test bars are tested for the following physical properties: tensile strength, ASTM D-1708; flexural strength and flexural modulus, ASTM D-790; impact strength, ASTM D-256 and warpage. Warpage is measured in mils on a disk four inches in diameter by 1/16 inch thick as molded. The formulations and the physical properties are set forth in Table 2.

poly(ethylene sodium acrylate) copolymer ionomer, Surlyn 8550, Dupont;
poly(ethylene zinc acrylate) copolymer ionomer, Surlyn 9020, Dupont.

The compositions are extruded and molded into stan-

TABLE 2

| | Glass Reinforced Polyester Blends | | | | | |
|---|---|---|---|---|---|---|
| | A | B | C | D | E | F |
| Formulation | | | | | | |
| PBT | 71.5 | 59.7 | 59.7 | 71.5 | 59.7 | 59.7 |
| Fiberglass | 10.0 | 10.0 | 10.0 | 18.0 | 18.0 | 18.0 |
| Lubricant | 0.3 | 0.3 | 0.3 | 0.5 | 0.5 | 0.5 |
| ABS impact modifier | 10.0 | 10.0 | 10.0 | 10.0 | 10.0 | 10.0 |
| Polycarbonate | — | 20.0 | — | — | 20.0 | — |
| Kodar PETG-6763 | — | — | 20.0 | — | — | 20.0 |
| Properties | | | | | | |
| Tensile Strength (psi) | 9,100 | 9,400 | 9,400 | 12,000 | 12,700 | 11,800 |
| Flex. Strength (psi) | 14,800 | 15,400 | 14,500 | 18,700 | 19,600 | 18,400 |
| Flex. Modulus (psi) $\times 10^5$ | 5.0 | 5.3 | 5.0 | 7.4 | 7.3 | 7.2 |
| Notched Izod (ft-lb/in) | 1.4 | 1.4 | 1.5 | 1.8 | 2.0 | 1.8 |
| Unnotched Izod (ft-lb/in) | 9.8 | 8.7 | 10.5 | 11.1 | 12.5 | 12.0 |
| Warpage (mil) 4" × 1/16" disk | 190 | 90 | 110 | 240 | 60 | 100 |

In comparing Samples A and D in Table 2, it can be seen that increasing the fiberglass content of the blend, results in substantially increased warpage of the test sample. On the other hand, by comparing Samples C and F which are directed to polyester blends in accordance with the present invention, the increased amount of glass reinforcement does not have an negative effect on warpage. Thus, it can be seen that the polyester blend of the present invention acts in a similar manner to a PBT and polycarbonate blend, Samples B and E.

EXAMPLE 3

The following ingredients are dried:
polybutylene terephthalate, intrinsic viscosity, 1.0 dl/g, Celanex, Hoechst Celanese;
fiberglass;
ABS impact modifier as in Example 2;
polycarbonate as in Example 2;
poly(ethylene 1,4 cyclohexanedimethylene terephthalate) as in Example 2;
poly(ethylene ethylacrylate) copolymer, DPDA-6182, Union Carbide;
poly(ethylene acrylic acid) copolymer, Primacor 3330, Dow Chemical;

dard test bars by the procedure of Example 2. The test bars are tested for the physical properties as in Example 2 with the addition that the warpage of the test disc is measured along the disc axis parallel to the flow of the blend in the mold as well as transverse to the flow direction in the mold. The formulations and physical properties are set forth in Table 3.

TABLE 3

| | A | B | C | D | E | F | G |
|---|---|---|---|---|---|---|---|
| Formulation | | | | | | | |
| PBT | 59.5 | 59.7 | 59.7 | 69.7 | 69.7 | 69.7 | 69.7 |
| Fiberglass | 18.0 | 10.0 | 10.0 | 10.0 | 10.0 | 10.0 | 10.0 |
| Lubricant | 0.5 | 0.3 | 0.3 | 0.3 | 0.3 | 0.3 | 0.3 |
| ABS impact modifier | 10.0 | 10.0 | 10.0 | 10.0 | 10.0 | 10.0 | 10.0 |
| Polycarbonate | | 20.0 | | | | | |
| PETG-6763 | 12.0 | | 20.0 | | | | |
| Poly(ethylene ethylarylate) | | | | 10.0 | | | |
| Poly(ethylene acrylic acid) | | | | | 10.0 | | |
| Polyethylene Na acrylate) | | | | | | 10.0 | |
| Polyethylene Zn acrylate) | | | | | | | 10.0 |
| Properties | | | | | | | |
| Warpage with flow (mils) | 214 | 141 | 157 | 238 | 349 | 383 | 310 |
| Transverse to flow (mils) | 109 | 63.6 | 73.2 | 113 | 154 | 146 | 124 |
| Tensile strength (psi) | 11,194 | 9,796 | 8,950 | 7,771 | 6,540 | 6,538 | 7,006 |
| % Elongation | 2.8 | 4.1 | 3.8 | 4.2 | 3.7 | 5.2 | 4.0 |
| Flexural strength (psi) | 17,212 | 15,974 | 14,118 | 12,069 | 10,034 | 10,754 | 11,065 |
| Flexural Modulus (psi) | 7.3 | 5.3 | 4.9 | 4.4 | 4.2 | 4.4 | 4.2 |
| Notched Izod (ft-lb/in) | 2.03 | 1.85 | 1.72 | 1.80 | 1.21 | 1.23 | 1.11 |
| Unnotched Izod (ft-lb/in) | 11.5 | 11.1 | 10.9 | 11.0 | 8.0 | 10.3 | 9.1 |

From Table 3, it can be seen that the composition blend of the instant invention (Sample C) produces a molded article of improved warpage relative to the blend of PBT and amorphous poly(ethylene acrylate) copolymers. The invention blend produces molded articles having similar warpage and physical properties as the article from the PBT and polycarbonate blend (Sample B).

EXAMPLE 4

Polybutylene terephthalate, fiberglass, lubricant, ABS impact modifier, polycarbonate, PETG-6763 and poly(ethylene ethylacrylate) all as in Example 3 are dried, compounded and molded into standard test bars as in Example 2. The physical properties are measured as in the previous examples with the addition of heat deflection temperature under load, ASTM D-648. The formulations and physical properties are set forth in Table 4.

TABLE 4

|  | B | C | D | E | F | G | H |
|---|---|---|---|---|---|---|---|
| PBT | 59.5 | 59.5 | 54.5 | 64.5 | 59.7 | 59.7 | 49.7 | 59.7 |
| Fiberglass | 18.0 | 18.0 | 18.0 | 18.0 | 10.0 | 10.0 | 10.0 | 10.0 |
| Lubricant | 0.5 | 0.5 | 0.5 | 0.5 | 0.3 | 0.3 | 0.3 | 0.3 |
| ABS impact modifier | 10.0 | 10.0 | 10.0 | — | 10.0 | 10.0 | 10.0 | — |
| Polycarbonate | 12.0 |  |  |  | 20.0 |  |  |  |
| PETG-6763 |  | 12.0 | 12.0 | 12.0 |  | 20.0 | 20.0 | 20.0 |
| Poly(ethylene ethylacrylate) |  |  | 5.0 | 5.0 |  |  | 10.0 | 10.0 |
| Properties |  |  |  |  |  |  |  |  |
| Warpage with flow (mils) | 62 ± 40 | 98 ± 10 | 40 ± 10 | 170 ± 10 | 86 ± 20 | 112 ± 10 | 115 ± 30 | 142 ± 10 |
| Tensile strength (psi) | 12,655 | 11,787 | 10,741 | 12,589 | 9,386 | 9,397 | 7,979 | 9,358 |
| % Elongation | 3.2 | 3.0 | 3.4 | 2.95 | 4.1 | 3.7 | 4.0 | 3.5 |
| Flexural strength | 19,612 | 18,453 | 16,666 | 19,581 | 15,410 | 14,529 | 12,419 | 14,611 |
| Flexural modulus × $10^5$ (psi) | 7.3 | 7.2 | 6.5 | 7.5 | 5.3 | 5.0 | 4.3 | 4.8 |
| Notched Izod (ft-lb/in) | 1.95 | 1.82 | 2.07 | 1.6 | 1.4 | 1.5 | 1.7 | 1.3 |
| Unnotched Izod (ft-lb/in) | 12.5 | 12.0 | 11.8 | 11.6 | 8.7 | 10.5 | 10.3 | 10.0 |
| Physical Density | 1.381 | 1.396 | 1.366 | 1.388 | 1.338 | 1.336 | 1.282 | 1.308 |
| HDT °C. at 264 psi | 160 | 164 | 152 | 170 | 110 | 87 | 83 | 97 |

As can be seen from Table 4, Sample D which does not include the ABS impact modifier but only includes the 5 wt.% poly(ethylene ethylacrylate) still has improved impact strength relative to a glass filled PBT composition.

EXAMPLE 5

Polybutylene terephthalate having an intrinsic viscosity of 0.7 dl/g, Celanex, Hoechst Celanese, KODAR copolyesters from Eastman Chemical Products and the poly(ethylene ethylacrylate) used in Example 3 are formulated and molded into standard test bars as in the previous examples and are tested as before. In addition, shrinkage, which is measured on a ⅛ inch × 4 inch diameter disk is measured in mils per inch. The formulation and properties are shown in Table 5.

EXAMPLE 6

Polybutylene terephthalate and Kodar PCTG-5445 are blended using the ingredients as set forth in Example 5 and the compositions are molded into standard test bars as previously described. Table 6 illustrates the formulations and the physical properties of the blends.

TABLE 6

| Formulation | A | B | C |
|---|---|---|---|
| PBT | 74.7 | 64.7 | 99.7 |
| PCTG-5445 | 20.0 | 30.0 |  |
| Poly(ethylene ethylacrylate) | 5.0 | 5.0 |  |
| Lubricant | 0.3 | 0.3 | 0.3 |
| Properties |  |  |  |
| Shrinkage with flow (mil/in) | 13.0 | 10.2 | 16.9 |
| Transverse to flow (mil/in) | 4.0 | 2.0 | 9.0 |
| Tensile strength (psi) | 7,370 | 6,920 | 8,090 |
| % Elongation | 10 | 15 | 19 |
| Notched Izod (ft-lb/in) | 0.88 | 0.86 | 0.60 |
| Flex Strength (psi) | 10,500 | 9,690 | 11,990 |

TABLE 5

|  | A | B | C | D | E | F | G | H | I | J |
|---|---|---|---|---|---|---|---|---|---|---|
| Formulation |  |  |  |  |  |  |  |  |  |  |
| PBT | 99.7 | 89.7 | 79.7 | 69.7 | 59.7 | 49.7 | 84.7 | 74.7 | 89.7 | 69.7 |
| KODAR PETG-6763 |  | 10.0 | 20.0 | 30.0 | 40.0 | 50.0 | 10.0 | 20.0 |  |  |
| Poly(ethylene ethylacrylate) |  |  |  |  |  |  |  |  | 5.0 | 5.0 |
| Lubricant | 0.3 | 0.3 | 0.3 | 0.3 | 0.3 | 0.3 | 0.3 | 0.3 | 0.3 | 0.3 |
| KODAR PCTG 5445 |  |  |  |  |  |  |  |  | 10.0 | 30.0 |
| Properties |  |  |  |  |  |  |  |  |  |  |
| Shrinkage with flow (mils/in) | 19.7 | 18.7 | 15.7 | 11.5 |  |  | 17.4 | 15.3 | 16.5 | 7.7 |
| Transverse to flow (mils/in) | 14.5 | 13.1 | 10.5 | 5.2 | E and F |  | 12.1 | 5.0 | 5.4 | 2.0 |
| Tensile strength yield (psi) | 8,360 | 8,450 | 8,470 | 8,200 | Could not be molded |  | 7,180 | 7,200 | 8,090 | 7,620 |
| Tensile strength break (psi) | 8,750 | 7,720 | 7,300 | 6,100 |  |  | 6,250 | 4,630 | 6,160 | 6,010 |
| Elongation | 6.7 | 17 | 29 | 85 |  |  | 16 | 18 | 11 | 8.4 |
| Flex Strength (psi) | 12,100 | 12,800 | 12,400 | 11,900 |  |  | 10,820 | 10,100 | 11,900 | 11,200 |
| Flex Mod. × $10^5$ (psi) | 3.5 | 3.7 | 3.5 | 3.3 |  |  | 3.1 | 3.1 | 3.4 | 3.0 |
| Notched Izod (ft-lb/in) | 0.55 | 0.58 | 0.66 | 0.75 |  |  | 0.76 | 0.78 | 0.71 | 2.80 |

TABLE 6-continued

| Formulation | A | B | C |
|---|---|---|---|
| Flex Mod. × 10⁵ (psi) | 2.87 | 2.65 | 3.44 |
| HDT °C. at 264 psi | 53 | 51 | 50 |
| Density | 1.298 | 1.298 | 1.310 |

As can be seen from Table 6, the polyester blends of the present invention have substantially reduced shrinkage relative to a control polybutylene terephthalate sample.

EXAMPLE 7

Polybutylene terephthalate and Kodar blends are formulated and molded into standard test bars as in Examples 5 and 6. Table 7 sets forth both the formulations and physical properties including shrinkage relative to a control butylene terephthalate sample.

TABLE 7

|  | Control | A | B | C | D | E | F |
|---|---|---|---|---|---|---|---|
| Formulation |  |  |  |  |  |  |  |
| PBT | 99.7 | 69.7 | 64.7 | 74.7 | 69.7 | 69.7 | 74.7 |
| KODAR PETG-6763 |  | 30.0 | 30.0 | 15.0 | 15.0 |  |  |
| KODAR PCTG-5445 |  |  |  |  |  | 15.0 | 15.0 |
| Poly(ethylene ethylacrylate) |  |  | 5.0 |  | 5.0 | 5.0 |  |
| Fiberglass |  |  |  | 10.0 | 10.0 | 10.0 | 10.0 |
| Lubricant | 0.3 | 0.3 | 0.3 | 0.3 | 0.3 | 0.3 | 0.3 |
| Properties |  |  |  |  |  |  |  |
| Shrinkage with flow (mil/in) | 16.6 | 12.7 | 12.2 | 3.3 | 3.1 | 3.0 | 3.4 |
| Transverse to flow (mile/in) | 7.9 | 9.5 | 9.7 | 10.9 | 12.1 | 11.3 | 10.3 |
| Tensile strength yield (psi) | 7,621 | 7,966 | 6,742 |  |  |  |  |
| Tensile Strength break (psi) | 4,505 | 8,011 | 3,935 | 10,910 | 11,224 | 10,938 | 10.650 |
| % Elongation | 11.2 | 3.5 | 3.4 | 2.3 | 3.0 | 3.3 | 2.2 |
| Flex strength (psi) | 12,790 | 12,873 | 11,356 | 18,750 | 17,610 | 17,484 | 18.030 |
| Flex Mod. × 10⁵ (psi) | 3.7 | 3.5 | 3.2 | 5.9 | 5.5 | 5.4 | 5.5 |
| Notched Izod (ft-lb/in) | 0.57 | 0.59 | 0.59 | 0.65 | 0.73 | 0.80 | 0.65 |
| HDT °C. at 264 psi | 56 | 57 | 55 | 151 | 152 | 155 | 144 |
| Density | 1.310 | 1.300 | 1.28 | 1.368 | 1.348 | 1.342 | 1.360 |

As can be seen from Table 7, Samples C-F have greatly reduced shrinkage relative to the PBT control. This shrinkage is comparable to ABS resin which is used to mold keycaps.

EXAMPLE 8

In this example, PBT and Kodar blends are formulated and molded into standard test bars as in Examples 5-7. The compositions are filled with a fiberglass/glass bead and fiberglass/mica combined filler to improve shrinkage and warpage of test samples. The formulations and properties are set forth in Table 8.

TABLE 8

| Material | A | B |
|---|---|---|
| PBT | 60.7 | 60.7 |
| KODAR PETG-6763 | 10.0 | 10.0 |
| Poly(ethylene acrylate) | 5.0 | 5.0 |
| Lubricant | 0.3 | 0.3 |
| Glass Beads[1] | 7.5 |  |
| Mica[2] |  | 7.5 |
| Fiberglass[3] | 7.5 | 7.5 |
| Properties |  |  |
| Tensile Strength (psi) | 8,660 | 9,160 |
| % Elong | 3 | 3 |
| Flex Strength (psi) | 14,900 | 15,500 |
| Flex Mod (psi) | 530,000 | 580,000 |
| HDT °F. | 258 | 232 |
| Notched Izod (ft-lb/in) | 0.7 | 0.6 |

TABLE 8-continued

| Material | A | B |
|---|---|---|
| Shrinkage (mil/in) | 6 | 6 |
| Warpage (mils) | 13.0 | 10.0 |

[1]CP 2530 Beads. 65-70 microns average diameter. Potters Industries
[2]M-800. Eagle Quality Products, Uwchland. Pa.
[3]CT 930 A4. Certan-Teed Corp., Valley Forge. Pa.

As can be seen from Table 8, both shrinkage and warpage are good with the test samples and comparable to ABS resin which has a shrinkage of 6 mils per inch and a warpage of about 3.5 mils. The PBT resin samples can be printed by sublimation printing techniques while ABS samples cannot be so printed.

What is claimed is:

1. A composition comprising a polyester blend of 50 to 90% by weight of said blend of polybutylene terephthalate consisting essentially of recurring 1,4-butylene terephthalate units, and 10 to 50% by weight of said blend of a copolyester consisting essentially of condensed units of ethylene glycol, cyclohexane dimethanol and terephthalic acid, said copolyester containing about 70 mol% of said ethylene glycol units relative to the total glycol content.

2. The composition of claim 1 wherein said blend comprises about 70 to 85% by weight polybutylene terephthalate and about 15 to 30% by weight of said copolyester.

3. The composition of claim 1 further including an impact modifier.

4. The composition of claim 3 wherein said impact modifier comprises about 2 to about 30 wt.% based on the total weight of the composition.

5. The composition of claim 3 wherein said impact modifier comprises a multiphase interpolymer comprising:

(i) from 25 to 95 percent, by weight based on the total weight of the interpolymer, of a first elastomeric phase polymerized from a monomer system comprising from 75 to 99.8 percent by weight, based on the first elastomeric phase, of a $C_1$ to $C_6$ alkyl acrylate, from 0.1 to 5 percent by weight of a cross-linking monomer, which is polyethylenically unsaturated monomer, with a plurality of addition polymerizable reactive groups of from 0.1 to 5 percent by weight of a graft-linking monomer having a plurality of addition polymerizable reactive groups; and (ii) from 75 to 5 percent by weight, based on the total weight of the interpolymer, of a final rigid thermoplastic phase polymerized in the presence of the elastomeric phase.

6. The composition of claim 5 wherein said impact modifier is present in amounts of from about 10 to 30 wt.% based on the weight of the composition.

7. The composition of claim 1 further including a reinforcing amount of a reinforcing filler.

8. The composition of claim 7 wherein said reinforcing filler comprises glass.

9. The composition of claim 8 wherein said glass comprises glass fibers.

10. The composition of claim 1 further including a flame retardant.

11. A key cap molded from the composition of claim 1.

12. The key cap of claim 11 wherein said key cap is printed with indicia.

13. The key cap of claim 12 wherein said indicia is provided by sublimation printing.

14. The key cap of claim 11 including a reinforcing filler.

15. The key cap of claim 14 wherein said reinforcing filler comprises glass fiber.

16. The key cap of claim 14 wherein said reinforcing filler comprises a mixture of glass fibers and glass beads.

17. The key cap of claim 14 wherein said reinforcing filler comprises a mixture of glass fibers and mica.

18. The key cap of claim 11 including an impact modifier.

19. The key cap of claim 18 wherein said impact modifier is present in amounts of from about 10 to 30 wt.% based on the weight of the composition.

* * * * *